US009113602B2

(12) United States Patent
Hachisuka

(10) Patent No.: US 9,113,602 B2
(45) Date of Patent: Aug. 25, 2015

(54) CHIP RECEIVER AND HEDGE TRIMMER HAVING THE SAME

(75) Inventor: Tomohiro Hachisuka, Anjo (JP)

(73) Assignee: MAKITA CORPORATION, Anjo-Shi (JP)

(*) Notice: Subject to any disclaimer, the term of this patent is extended or adjusted under 35 U.S.C. 154(b) by 306 days.

(21) Appl. No.: 13/500,033

(22) PCT Filed: Sep. 2, 2010

(86) PCT No.: PCT/JP2010/064997
§ 371 (c)(1),
(2), (4) Date: Apr. 3, 2012

(87) PCT Pub. No.: WO2011/045986
PCT Pub. Date: Apr. 21, 2011

(65) Prior Publication Data
US 2012/0192433 A1 Aug. 2, 2012

(30) Foreign Application Priority Data
Oct. 14, 2009 (JP) ................. 2009-236811

(51) Int. Cl.
B26B 19/02 (2006.01)
A01G 3/053 (2006.01)
A01G 3/02 (2006.01)

(52) U.S. Cl.
CPC .......... A01G 3/053 (2013.01); A01G 2003/023 (2013.01); Y10T 83/222 (2015.04)

(58) Field of Classification Search
CPC ....... A01G 3/053; A01G 3/0417; A01G 3/04; A01G 3/0475; A01G 3/0408; A01G 3/025; A01G 3/085; A01G 3/067; A01G 3/06; A01G 3/062; A01G 2003/023; A01D 43/063
USPC ............... 30/124, 208, 210–221, 167; 56/194
See application file for complete search history.

(56) References Cited

U.S. PATENT DOCUMENTS 2,281,189 A * 4/1942 Wright ........................... 30/132
2,337,285 A * 12/1943 Widdowson ....................... 56/1
(Continued)

FOREIGN PATENT DOCUMENTS

CN 200956746 Y 10/2007
EP 1 911 344 A2 4/2008
(Continued)

OTHER PUBLICATIONS

Russian Office Action issued in Russian Patent Application No. 2012119546 on Jun. 14, 2013 (with translation).
(Continued)

Primary Examiner — Sean Michalski
Assistant Examiner — Jonathan G Riley
(74) Attorney, Agent, or Firm — Oliff PLC

(57) ABSTRACT

The disclosed hedge trimmer is provided with a main body, a blade unit supported by the main body and a chip receiver supported by the blade unit. The chip receiver is attached to the blade unit. The chip receiver is positioned at an opposite side of the blade unit from cutting edges of the blade unit and receives branches and leaves cut by the cutting edges. The chip receiver has a concavo-convex shape including a longitudinal rib, traverse rib and projections formed of a edge of the chip receiver, to prevent the received branches and leaves from dropping.

15 Claims, 6 Drawing Sheets

(56) References Cited

U.S. PATENT DOCUMENTS

| | | | | |
|---|---|---|---|---|
| 2,510,311 A | * | 6/1950 | Greene | 30/132 |
| 2,747,276 A | * | 5/1956 | Yatsko | 30/132 |
| 3,073,025 A | * | 1/1963 | Yatsko | 30/132 |
| 3,520,058 A | * | 7/1970 | Pfaffenbach | 30/134 |
| 3,552,013 A | * | 1/1971 | Stone | 30/132 |
| 3,795,050 A | * | 3/1974 | Latsha | 30/132 |
| 3,916,521 A | * | 11/1975 | Sekelsky | 30/132 |
| 3,990,145 A | * | 11/1976 | Rubin | 30/132 |
| 4,071,951 A | * | 2/1978 | Burns | 30/132 |
| 4,464,837 A | * | 8/1984 | Amstutz | 30/134 |
| 4,648,238 A | * | 3/1987 | Greider et al. | 56/202 |
| D351,537 S | * | 10/1994 | Yagin | D8/1 |
| 5,653,029 A | * | 8/1997 | Shigenaka | 30/132 |
| 5,659,958 A | * | 8/1997 | Goings | 30/124 |
| D424,386 S | * | 5/2000 | Lundeen et al. | D8/1 |
| D425,766 S | * | 5/2000 | Lundeen et al. | D8/1 |
| 7,155,830 B2 | * | 1/2007 | Sasaki et al. | 30/210 |
| 8,074,435 B1 | * | 12/2011 | Pandit | 56/239 |
| 8,307,554 B1 | * | 11/2012 | Lambert | 30/132 |
| 2009/0235536 A1 | * | 9/2009 | Sowell et al. | 30/233 |

FOREIGN PATENT DOCUMENTS

| | | |
|---|---|---|
| FR | 2494551 | 5/1982 |
| JP | A-2002-233243 | 8/2002 |
| JP | A-2002-291338 | 10/2002 |
| JP | A-2003-111520 | 4/2003 |
| JP | A-2008-307058 | 12/2008 |

OTHER PUBLICATIONS

Oct. 18, 2013 Office Action issued in Chinese Patent Application No. 201080046529.7 (with translation).

Nov. 22, 2012 Office Action issued in Chinese Application No. 201080046529.7 (with partial translation).

May 14, 2013 Office Action issued in Chinese Application No. 201080046529.7 (with translation).

Oct. 16, 2012 Office Action issued in Japanese Application No. 2009-236811 (with translation).

Nov. 16, 2010 International Search Report issued in International Patent Application No. PCT/JP2010/064997 (with translation).

Nov. 16, 2010 Written Opinion issued in International Patent Application No. PCT/JP2010/064997 (with translation).

Jun. 17, 2014 European Search Report issued in European Patent application No. 10823254.7.

* cited by examiner

CHIP RECEIVER AND HEDGE TRIMMER HAVING THE SAME

TECHNICAL FIELD

The present invention relates to a chip receiver (also referred to as a leaf receiver or a leaf collector) for use in a hedge trimmer.

BACKGROUND ART

A hedge trimmer is a power tool that is used for trimming a hedge. A hedge trimmer includes a blade unit which extends linearly, and the blade unit is provided with a plurality of cutting edges for cutting branches and leaves along a longitudinal direction. The blade unit is driven by a prime mover such as an engine or a motor. A user can easily trim the hedge by moving the blade unit along the hedge.

After the hedge is trimmed with the hedge trimmer, many branches and leaves that were cut remain in the hedge, and the user needs to collect such branches and leaves. Nevertheless, the branches and leaves that were cut often slip deep into the hedge, and the task of collecting the same is not easy. Consequently, the user tends to spend a lot of time and work collecting the branches and leaves that were cut.

In order to deal with the foregoing problem, a chip receiver for use in a hedge trimmer has been put into practical application (for example, refer to Japanese Unexamined Patent Application Publication No. 2008-307058). The chip receiver is a receiving pan-shaped member, and is mounted on the blade unit of the hedge trimmer. The chip receiver is mounted on a side that is opposite to cutting edges of the blade unit, and receives the branches and leaves that were trimmed by the cutting edges. In other words, the branches and leaves that were cut are collected by the chip receiver without falling inside the hedge. The user can shake off the branches and leaves that were collected by the chip receiver outside the hedge while trimming the hedge. Among the branches and leaves that were cut, since the amount of branches and leaves remaining in the hedge can be reduced, the user can easily collect the branches and leaves that were cut.

SUMMARY OF INVENTION

Technical Problem

A chip receiver is demanded of high collectability. In other words, the collection of more branches and leaves that were cut by the blade unit is demanded. For example, the chip receiver described in the foregoing patent document has a deep-bottom shape so that it can hold more branches and leaves. The teachings herein also aim to provide a chip receiver having high collectability.

Solution to Technical Problem

The branches and leaves that are received by the chip receiver sometimes fall from the chip receiver as a result of being pushed by other branches and leaves or the user moving the hedge trimmer, and this is one cause of deteriorating the collectability of the chip receiver. Thus, the teachings herein prevent the trimmed branches and leaves from falling from the chip receiver by providing concavity and convexity in the chip receiver, and thereby improves the collectability of the chip receiver.

The chip receiver according to the teachings herein is a chip receiver attached to a blade unit of a hedge trimmer, and includes a receiving portion that is positioned at one side of the blade unit that has a plurality of cutting edges at least at the other side and configured to receive branches and leaves cut by the plurality of cutting edges. The receiving portion has a concavo-convex shape that prevents the received branches and leaves from dropping. Here, the chip receiver does not need to be directly fixed to the blade unit, and, for example, it may be fixed to the main body of the hedge trimmer. The chip receiver merely needs to be attached to a specific position on the blade unit.

The chip receiver is structured to receive, from the blade unit side, the branches and leaves that were trimmed by the blade unit. Thus, the branches and leaves on the chip receiver tend to drop from the blade unit side. Therefore, in one embodiment of the teachings herein, preferably, the foregoing receiving portion includes a longitudinal rib that extends in a longitudinal direction of the blade unit. According to this structure, it is possible to inhibit the branches and leaves on the chip receiver from moving to the blade unit side and then dropping.

When the user moves the hedge trimmer, the blade unit often sways. Here, the branches and leaves on the chip receiver are subject to the centrifugal force heading toward the tip of the blade unit, and attempt to move along the longitudinal direction of the blade unit. Thus, in one embodiment of the present teachings herein, preferably, a traverse rib that traverses the longitudinal rib is additionally formed on the receiving portion. According to this configuration, it is possible to inhibit the branches and leaves on the chip receiver from moving in the longitudinal direction of the blade unit by using the traverse rib. It is thereby possible to prevent the branches and leaves on the chip receiver from dropping from the tip side of the blade unit.

The receiving portion of the chip receiver may be provided with a wall part that rises upward around its periphery so as to receive more branches and leaves. Nevertheless, even if a wall part is provided around the receiving portion, for instance, there are cases where long branches that were trimmed run upon the edge (upper end of the wall part) of the receiving portion. The branches that run upon the edge of the receiving portion sometimes fall off from the chip receiver when the user moves the hedge trimmer. Thus, in one embodiment of the teachings herein, protrusions are repeatedly formed on at least a part of the edge of the receiving portion. According to this structure, it is possible to inhibit the branches that run upon the edge of the receiving portion from falling off the chip receiver.

DETAILED DESCRIPTION OF INVENTION

Figure 1:
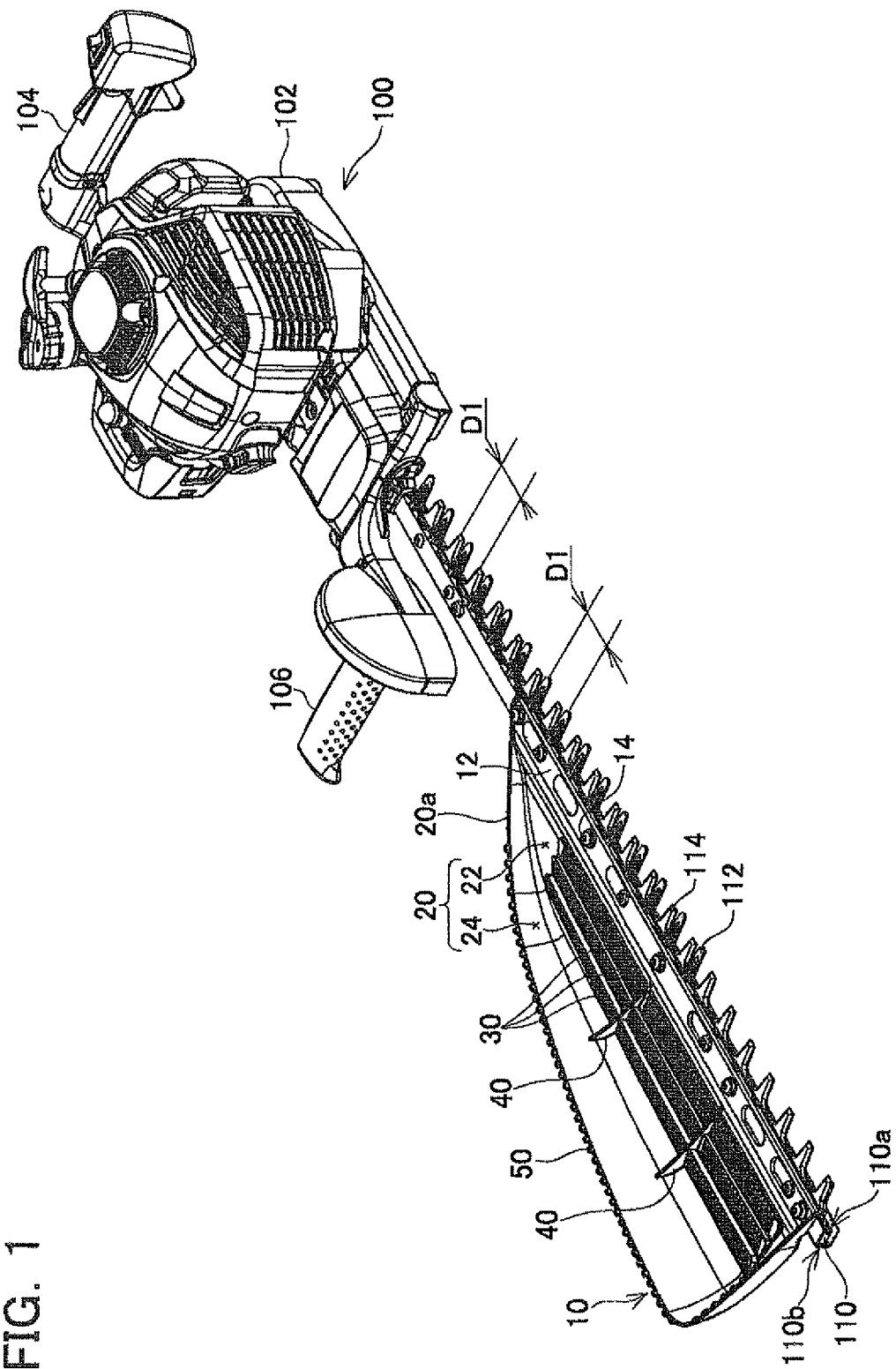
FIG. 1 shows the chip receiver and the hedge trimmer of the embodiment.

In one embodiment of the present teachings, preferably, the longitudinal rib includes a sloping surface that slopes down toward to an opposite side of the blade unit. According to this structure, based on their own weight, the branches and leaves on the longitudinal rib are subject to a force in a direction of being separated from the blade unit. It is thereby possible to inhibit the branches and leaves from moving toward the receiving aperture of the blade unit side and dropping off. Here, the sloping surface that slopes down means that the sloping surface slopes perpendicularly downward when the plurality of cutting edges of the blade unit is positioned horizontally.

Preferably, the foregoing longitudinal rib has a triangular cross-section in perpendicular to a longitudinal direction thereof and the sloping surface is located at an opposite side to the blade unit from a peak of the longitudinal rib.

Preferably, the peak of the foregoing longitudinal rib is located near a blade unit side than a middle position in a width direction of the longitudinal rib. According to this configuration, the sloping surface positioned at the opposite side of the blade unit of the longitudinal rib may further be broadened.

When the longitudinal rib is formed to have a triangular cross-section shape, depending on the triangular shape, the sloping surface on the blade unit side relative to the peak slopes down toward the blade unit. This kind of sloping surface is undesirable since the branches and leaves may move toward the blade unit. Thus, preferably, the peak of the foregoing longitudinal rib is located right above a boundary of the longitudinal rib on the blade unit side or on the blade unit side than the boundary of the longitudinal rib on the blade unit side. According to this structure, the sloping surface that slopes down toward the blade unit is not formed on the longitudinal rib.

In one embodiment of the teachings herein, the receiving portion may have a plurality of longitudinal ribs including a first longitudinal rib and a second longitudinal rib that is located at an opposite side of the blade unit from the first longitudinal rib. In the foregoing case, preferably, a sloping surface of the first longitudinal rib extends to the second longitudinal rib. According to this structure, the sloping surface of the first longitudinal rib may further be broadened.

In one embodiment of the teachings herein, the receiving portion may have a plurality of longitudinal ribs including a first longitudinal rib and a second longitudinal rib that is located at an opposite side of the blade unit from the first longitudinal rib. In the foregoing case, preferably, the first longitudinal rib is lower in height than the second longitudinal rib. According to this structure, the branches and leaves that were trimmed by the blade unit can smoothly run over the first longitudinal rib and move to the deep end of the chip receiver.

In one embodiment of the teachings herein, a plurality of grooves or holes may be formed on a surface of the longitudinal rib. According to this structure, the branches and leaves on the chip receiver can be inhibited from moving on the chip receiver as a result of getting hooked by the plurality of grooves or holes.

Preferably, each of the grooves or holes has an elongated shape in a direction traversing a longitudinal direction of the longitudinal rib. According to this structure, the movement of the branches and leaves to a direction that cannot be inhibited with the longitudinal rib can be inhibited with the plurality of grooves or holes.

In one embodiment of the teachings herein, preferably, a plurality of projections is formed on at least a part of an edge of the receiving portion. In the foregoing case, preferably, intervals between the plurality of projections are narrower than intervals between the plurality of cutting edges. With a hedge trimmer, it is not possible to cut branches that are thicker than the intervals between the cutting edges of the blade unit. Thus, the intervals between the projections formed on the edge do not need to be wider than the intervals between the cutting edges of the blade unit. Accordingly, it would be effective to design the intervals between the projections to be a range that is narrower than the intervals between the cutting edges.

Preferably, each of the projections has a concaved surface (surface of the blade unit side) that curves toward the blade unit. According to this structure, it is possible to inhibit the trimmed branches and leaves from running upon the edge of the receiving portion or going over the edge and then dropping.

In one embodiment of the teachings herein, the receiving portion may further include a traverse rib that traverses the longitudinal rib. In the foregoing case, preferably, the traverse rib is higher in height than the longitudinal rib. The trimmed branches and leaves need to go over the longitudinal rib and move to the inside of the chip receiver. Thus, the height of the longitudinal rib should not be too high. Meanwhile, since the trimmed branches and leaves do not need to move in the longitudinal direction of the blade unit on the chip receiver, the traverse rib can be formed relatively high. Accordingly, by designing the traverse rib to be higher in height than the longitudinal rib, the collectability of the chip receiver can be improved.

In one embodiment of the teachings herein, preferably, the receiving portion has a roughened surface. According to this structure, it is possible to increase the frictional resistance between the receiving portion and the branches and leaves, and thereby inhibit the movement and dropping of the branches and leaves on the chip receiver.

Embodiment

A chip receiver 10 of this embodiment and a hedge trimmer 100 having the same are now explained with reference to the drawings. Note that the chip receiver 10 is sometimes referred to as a leaf receiver or a leaf collector. Moreover, the hedge trimmer 100 is sometimes referred to as a hedge cutter or a gardening trimmer.

The hedge trimmer 100 is foremost explained. The hedge trimmer 100 is one type of gardening power tool that is used for trimming hedges. The hedge trimmer 100 includes a main body 102, and a blade unit 110 that extends linearly from the main body 102. The main body 102 has an engine as a prime mover built therein. Moreover, the main body 102 has a main grip 104 and a front grip 106 to be gripped by the user. The front grip 106 is provided with various switches and levers to be operated by the user. The user can hold the hedge trimmer 100 by gripping the two grips 104, 106.

The blade unit 110 includes a plurality of upper cutting edges 112 and a plurality of lower cutting edges 114. The plurality of upper cutting edges 112 and the plurality of lower cutting edges 114 are respectively aligned at fixed interval D1 along the longitudinal direction of the blade unit 110. The blade unit 110 is a so-called single-edged blade type, and the upper cutting edges 112 and the lower cutting edges 114 are provided only to one side 110a of the blade unit 110. The plurality of lower cutting edges 114 is reciprocally driven along the longitudinal direction of the blade unit 110 by the engine of the main body 102. Consequently, the upper cutting edges 112 and the lower cutting edges 114 repeatedly separate from and intersect each other. The user can trim a hedge by moving the blade unit 110 along the hedge.

The chip receiver 10 is now explained. As shown in FIG. 1, the chip receiver 10 is a receiving pan-shaped member, and is formed from a resin material. However, the chip receiver 10 may alternatively be formed from other materials such as a metal material. The chip receiver 10 includes a plate-shaped fixing portion 12 that extends linearly, and a receiving portion 20 that spreads to one side of the fixing portion 12. The fixing portion 12 of the chip receiver 10 is fixed to the blade unit 110 with a plurality of screws 14. Thus, the fixing portion 12 is provided with a plurality of holes 16 for inserting the screws 14 therein.

When the fixing portion 12 is fixed to the blade unit 110, the receiving portion 20 of the chip receiver 10 is disposed at an opposite side 110b of the cutting edges 112, 114 of the blade unit 100. The receiving portion 20 includes a bottom part 22 and a wall part 24. The wall part 24 is provided around the bottom part 22 (excluding the boundary with the fixing portion 12), and rises from the bottom part 22 in a sweeping form. The receiving portion 20 is positioned behind the cutting edges 112, 114 and receives the branches and leaves that were trimmed by the cutting edges 112, 114.

If the hedge trimmer 100 does not include the chip receiver 10, many branches and leaves that were cut remain in the trimmed hedge, and the user needs to collect such branches and leaves. The branches and leaves that were cut often slip deep into the hedge, and the task of collecting the same is not easy. Meanwhile, if the hedge trimmer 100 includes the chip receiver 10, many of the cut branches and leaves are collected by the chip receiver 10. The user can shake off the branches and leaves that were collected by the chip receiver 10 outside the hedge while trimming the hedge. Among the branches and leaves that were cut, since the amount of branches and leaves remaining in the hedge can be reduced, the user can thereafter easily collect the branches and leaves that were cut.

Figure 2:
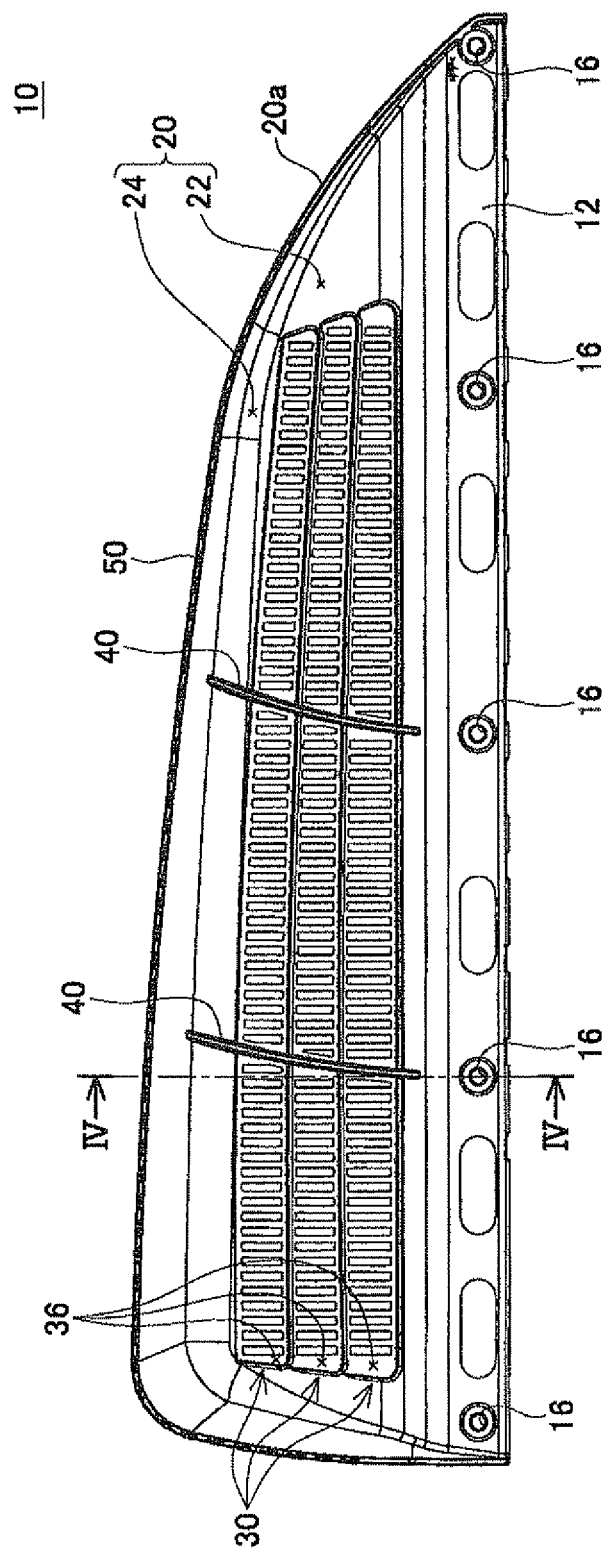
FIG. 2 is a plan view of the chip receiver.
Figure 3:
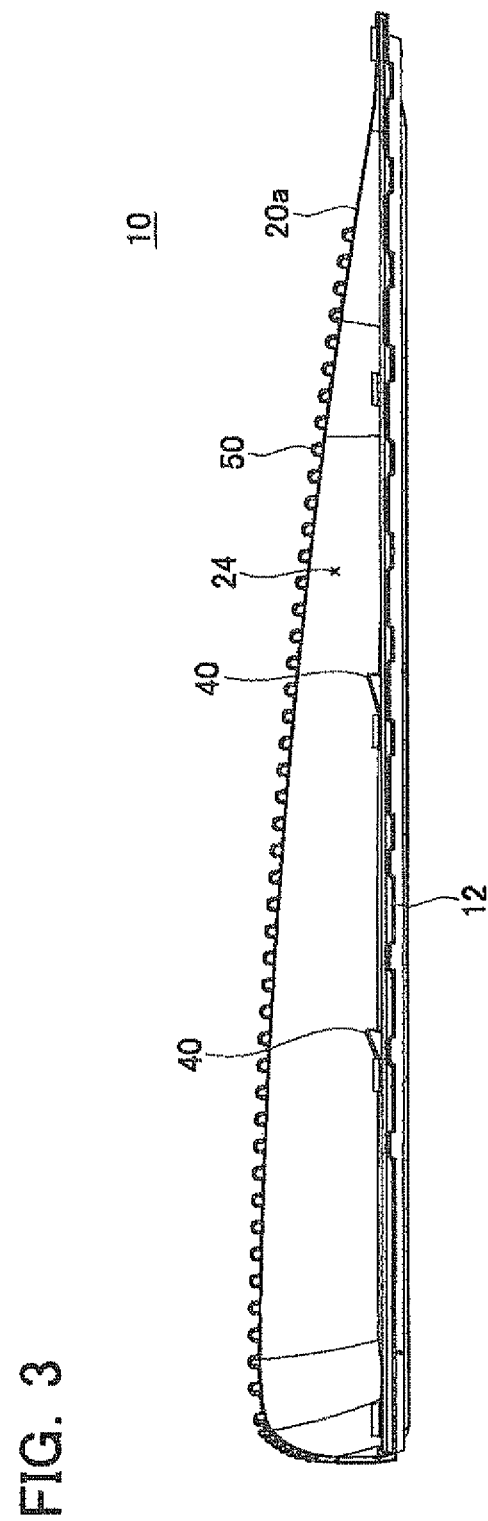
FIG. 3 is a front view of the chip receiver.
Figure 4:
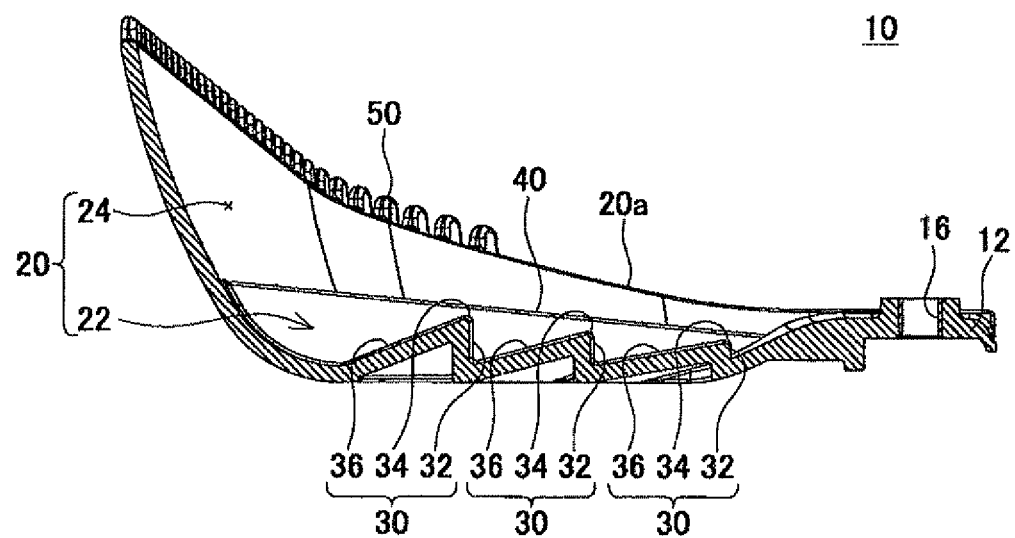
FIG. 4 is a cross section of line IV-IV of FIG. 2.

The detailed structure of the chip receiver 10 is now explained. As shown in FIG. 1, FIG. 2, and FIG. 4, three longitudinal ribs 30 are formed on the bottom part 22 of the receiving portion 20. The three longitudinal ribs 30 have an elongated shape in the longitudinal direction of the blade unit 110. The three longitudinal ribs 30 prevent the branches and leaves on the chip receiver 10 from moving toward the blade unit 110 side. It is thereby possible to prevent the branches and leaves that were received by the chip receiver 10 from dropping from the blade unit 110 side.

As shown in FIG. 4, the respective longitudinal ribs 30 have a triangular cross-section that is perpendicular to the longitudinal direction. The respective longitudinal ribs 30 include a peak 34 extending in the longitudinal direction of the blade unit 110, and a sloping surface 36 that spreads to an opposite side to the blade unit 110 from the peak 34. The sloping surface 36 slopes down toward an opposite side of the blade unit 110. Here, the sloping surface 36 that slopes down is assuming a case where the plurality of cutting edges 112, 114 of the blade unit 110 is positioned horizontally. According to this structure, based on its own weight, the branches and leaves that come into contact with the sloping surface 36 of the longitudinal ribs 30 are subject to force in a direction of heading to an opposite side of the blade unit 110. It is thereby possible to inhibit the branches and leaves from moving toward the blade unit 110 side and dropping off. Note that the foregoing sloping surface 36 can be formed on the longitudinal ribs 30 even if it does not have a triangular cross-section.

Preferably, the foregoing sloping surface 36 is provided as broad as possible. Thus, in this embodiment, the sloping surface 36 of the longitudinal ribs 30 has an elongated shape up to the other longitudinal ribs 30 that is adjacent at an opposite side to the blade unit 110 (excluding the longitudinal rib 30 located farthest at an opposite side to the blade unit 110). In other words, the three longitudinal ribs 30 are formed without any gaps therebetween, and form a stair-shaped concavo-convex shape on the bottom part 22. Moreover, in order to provide the sloping surface 36 as broad as possible, preferably, the peak 34 of the longitudinal ribs 30 is positioned more toward the blade unit 110 side than the middle position in the width direction of the longitudinal ribs 30. The closer the peak 34 is positioned on the blade unit 110 side, the greater the sloping surface 36 can be broadened.

Figure 8:
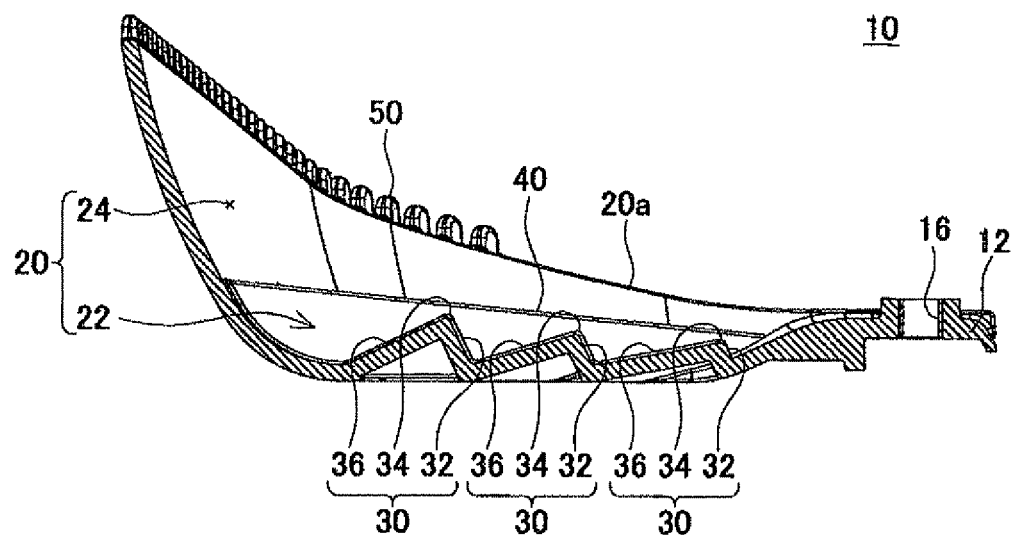
FIG. 8 shows a modified example of the longitudinal rib.
Figure 9:
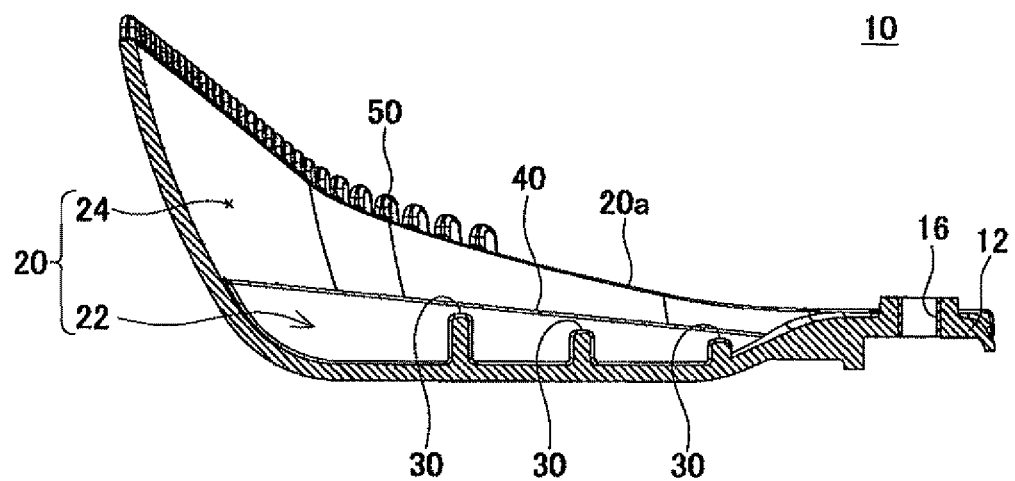
FIG. 9 shows another modified example of the longitudinal rib.

When the longitudinal ribs 30 are formed to have a triangular cross-section, depending on the triangular shape, the side face 32 on the blade unit 110 side of the longitudinal ribs 30 slopes down toward the blade unit 110 (refer to FIG. 8). When the side face 32 on the blade unit 110 side is sloped as described above, the branches and leaves move toward the blade unit 110, and this is relatively undesirable. Consequently, in this embodiment, the longitudinal ribs 30 have a right triangular cross-section shape, and the side face 32 on the blade unit 110 side is designed to be perpendicular to the horizontal plane. In other words, the peak 34 of the longitudinal ribs 30 is positioned upward of the boundary on the blade unit 110 side of the longitudinal ribs 30. Consequently, with the respective longitudinal ribs 30, the side face 32 on the blade unit 110 side has an elongated shape that is perpendicular to the horizontal plane. Note that the peak 34 of the longitudinal ribs 30 may be positioned further on the blade unit 110 side relative to the boundary on the blade unit 110 side of the longitudinal ribs 30. In the foregoing case, the normal of the side face 32 on the blade unit 110 side of the longitudinal ribs 30 faces further downward than the horizontal plane.

As shown in FIG. 4, with the three longitudinal ribs 30, those positioned more toward the blade unit 110 side are designed to have a lower height. According to this structure, the branches and leaves that are successively trimmed by the blade unit 110 can smoothly run over the three longitudinal ribs 30 and move to the deep end of the chip receiver 10.

As shown in FIG. 2, the longitudinal ribs 30 have a plurality of grooves 38 on its surface. The plurality of grooves 38 is formed on the sloping surface 36 of the longitudinal ribs 30. The respective grooves 38 have a rectangular shape, and are of an elongated shape in the direction traversing the longitudinal direction of the longitudinal ribs 30. According to this structure, the branches and leaves on the chip receiver 10 are inhibited from moving on the chip receiver 10 as a result of getting hooked in the plurality of grooves 38. In particular, since the respective grooves 38 are of an elongated shape in a direction that is different from the longitudinal ribs 30, the movement of branches and leaves to a direction that cannot be inhibited by the longitudinal ribs 30 can be effectively inhibited. Note that similar effects can be yielded even if holes are formed on the longitudinal ribs 30 in substitute for the grooves 38.

As shown in FIG. 1, FIG. 2, FIG. 3, and FIG. 4, a plurality of projections 50 is formed on an edge (upper end of the wall part 24) 20a of the receiving portion 20. With the chip receiver 10, for example, long branches that were trimmed sometimes run upon the edge 20a of the receiving portion 20. The branches that run upon the edge 20a of the receiving portion 20 tend to slip off from the edge 20a of the receiving portion 20 when the user moves the hedge trimmer 100. With respect to this point, the chip receiver 10 of this embodiment can inhibit the branches that run upon the edge 20a of the receiving portion 20 from slipping off the chip receiver 10 since the branches get hooked on the plurality of projections 50. Note that the plurality of projections 50 can alternatively be provided to the edge 20a of the receiving portion 20 for forming a plurality of notches.

Figure 5:
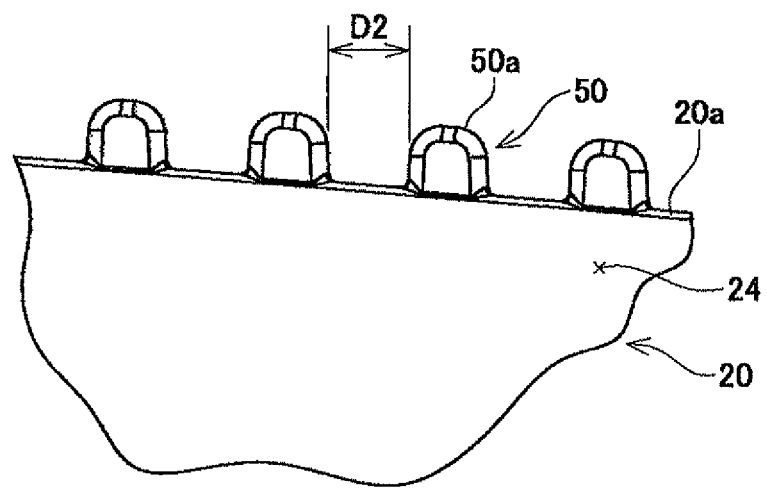
FIG. 5 is an enlarged view of the edge of the chip receiver.

FIG. 5 is an enlarged view of the edge 20a of the receiving portion 20. As shown in FIG. 5, with the projections 50 formed on the edge 20a, its apex 50a is molded in an arc shape. According to this structure, the branches that run upon the edge 20a tend to become fitted between the projections 50, and thus will not slip off from the chip receiver 10 easily. Moreover, the internal D2 of the projections 50 is designed to be narrower than the interval D1 of the cutting edges 112, 114 of the blade unit 110. With the hedge trimmer 100, it is not possible to cut branches that are thicker than the interval of the cutting edges 112, 114. Thus, the interval D2 of the projections 50 formed on the edge 20a does not need to be broader than the interval D1 of the cutting edges 112, 114. Accordingly, it is effective to design the interval D2 of the projections 50 to be within a range that is narrower than the interval of the cutting edges 112, 114.

Figure 6:
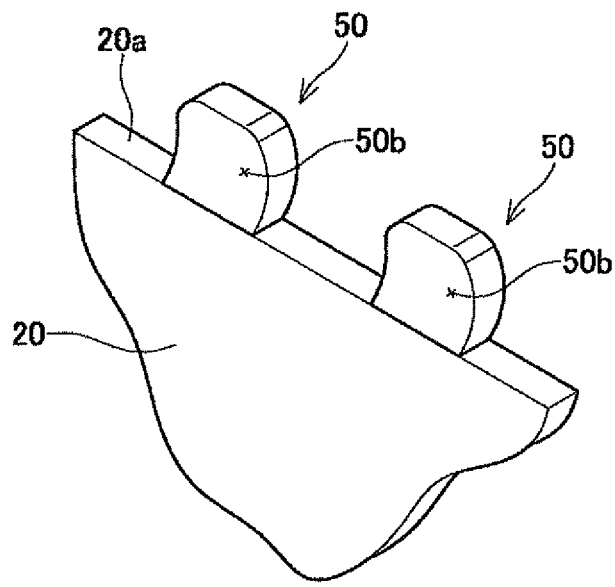
FIG. 6 illustrates the projections in which the surface is bent concavely.
Figure 7:
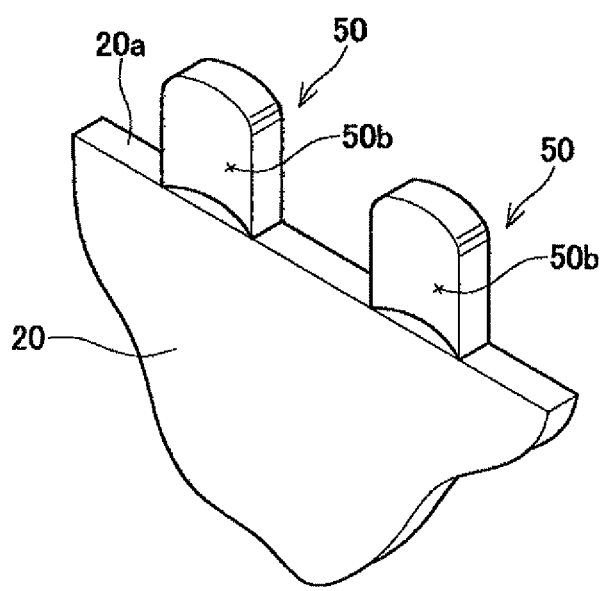
FIG. 7 illustrates the projections in which the surface is bent concavely.

As shown in FIG. 6 and FIG. 7, the surface 50b on the blade unit 110 side of the projections 50 can alternatively be curved concavely. According to this structure, it is possible to inhibit the trimmed branches and leaves from running upon the edge 20a of the receiving portion 20 and going over and falling from the edge 20a. Here, with the projections 50 shown in FIG. 6, its surface 50b is curved along the height direction, and with the projections 50 shown in FIG. 7, its surface 50b is curved along the width direction. Regardless of the direction of the curve, a significant effect is yielded. Moreover, the surface 50b of the projections 50 can alternatively be curved along both directions; namely, the height direction and the width direction.

As shown in FIG. 1, FIG. 2, FIG. 3, and FIG. 4, two traverse ribs 40 are formed on the bottom part 22 of the receiving portion 20. The respective traverse ribs 40 have an elongated shape that traverses the three longitudinal ribs 30. The respective traverse ribs 40 prevent the branches and leaves on the chip receiver 10 from moving and inhibit the branches and leaves from dropping off the chip receiver 10. In particular, since the respective traverse ribs 40 are of an elongated shape that traverses the longitudinal ribs 30, they can effectively prevent the movement of the branches and leaves in a direction that cannot be inhibited by the longitudinal ribs 30. Here, the user of the hedge trimmer 100 often moves the blade unit 110 such that it sways, for example, upon shaking off the branches and leaves on the chip receiver 10 outside the hedge. In the foregoing case, the branches and leaves on the chip receiver 10 are subject to centrifugal force in the longitudinal direction of the blade unit 110, and attempt to move along the longitudinal direction of the blade unit 110. Nevertheless, this kind of movement of the branches and leaves is effectively inhibited by the traverse ribs 40. Note that the traverse ribs 40 of this embodiment is curved in an arc shape along the longitudinal direction of the traverse ribs 40 so that they can receive the branches and leaves subject to the foregoing centrifugal force. Moreover, the traverse ribs 40 positioned more toward the main body 102 side are curved along an arc with a smaller radius.

The two traverse ribs 40 are designed to have a higher height than the three longitudinal ribs 30. The reason for this is as follows. In other words, the branches and leaves that were trimmed by the blade unit 110 need to go over the longitudinal ribs 30 and move toward the inside of the chip receiver 10. Thus, preferably, the height of the longitudinal ribs 30 is not too high. Meanwhile, the trimmed branches and leaves do not need to move in the longitudinal direction of the blade unit 110 on the chip receiver 10. Thus, the traverse ribs 40 can be formed relatively high. Accordingly, by designing the traverse ribs 40 to have a higher height than the longitudinal ribs 30, the collectability of the chip receiver 10 can be further improved.

Although not shown, the receiving portion 20 is subject to crimp treatment, and its surface is roughened. Consequently, the friction resistance between the receiving portion 20 and the branches and leaves is increased, and the movement and dropping of the branches and leaves on the chip receiver 10 are inhibited. Note that the receiving portion 20 can be subject to other types of roughening treatment such as blast treatment in addition to the foregoing crimp treatment.

Accordingly, the chip receiver 10 of this embodiment has various concavo-convex shapes for inhibiting the dropping of the received branches and leaves such as the longitudinal ribs 30 extending in the longitudinal direction of the blade unit 110, the plurality of projections 50 formed on the edge 20a, the traverse ribs 40 that traverses the longitudinal ribs 30, and the roughened surface subject to roughening treatment. It is thereby possible to reduce the amount of branches and leaves that drop from the chip receiver 10, and realize high collectability of the chip receiver 10.

The above has described the embodiment of the teachings herein in detail, but this embodiment is merely exemplary of the teachings herein and not intended to limit the scope of the claims. The technologies described in the claims include a variety of examples obtained by modifying or changing the above-described embodiments.

For example, as shown in FIG. 8, the longitudinal ribs 30 do not necessarily need to have a right triangular cross-section. However, when the longitudinal ribs 30 have a triangular cross-section, its peak 34 should be positioned more toward the blade unit 110 side (fixing portion 12 side) than the middle position in the width direction of the longitudinal ribs 30. Consequently, the sloping surface 36 located at an opposite side of the blade unit 110 relative to the peak 34 can be made broader than the sloping surface 32 located on the blade unit 110 side relative to the peak 34. Otherwise, as shown in FIG. 8, the longitudinal ribs 30 do not necessarily need to have a triangular cross-section, and may alternatively have a simple structure extending in a wall shape.

In this embodiment, the chip receiver 10 for use in a single-edged blade type blade unit 110 was explained, but the various concavo-convex shapes adopted in the chip receiver 10 can similarly be adopted in a chip receiver for use in a double-edged blade type blade unit. Here, a double-edged blade type blade unit means a blade unit in which the plurality of upper cutting edges 112 and lower cutting edges 114 is arranged on either side of the blade unit 110.

The technical components described in the present specification or the drawings can be used independently or combined with other components to demonstrate the technical utility, and should not be limited to the combinations of the claims presented at the time of the filing of this application. The technologies illustrated in the present specification or the drawings accomplish a plurality of objectives simultaneously and provide the technical utility simply by achieving one of the objectives.

The invention claimed is:

1. A chip receiver attached to a blade unit of a hedge trimmer, wherein the blade unit extends in a longitudinal direction, the blade unit has a first side and a second side, the first side is an opposite side of the second side in a width direction which is perpendicular to the longitudinal direction of the blade unit, and the first side has a plurality of cutting edges arranged along the longitudinal direction, the chip receiver comprising a receiving portion that is positioned at the second side of the blade unit and configured to receive branches and leaves cut by the plurality of cutting edges, wherein:

the receiving portion comprises a first longitudinal rib and a second longitudinal rib that each extend in the longitudinal direction of the blade unit, the first and second longitudinal ribs each protrude in a height direction which is perpendicular to both the longitudinal direction and the width direction, the first and second longitudinal ribs are parallel-arranged in the width direction of the blade unit, the first longitudinal rib is located between the second longitudinal rib and the blade unit with respect to the width direction and the first longitudinal rib is located adjacent to the blade unit with respect to the width direction, and a distance from a peak to a bottom of the first longitudinal rib in the height direction is less than a distance from a peak to a bottom of the second longitudinal rib in the height direction.

2. The chip receiver as in claim 1, wherein the first longitudinal rib comprises a sloping surface that slopes down toward the second longitudinal rib.

3. The chip receiver as in claim 2, wherein the first longitudinal rib has a triangular cross-section in perpendicular to the longitudinal direction and the sloping surface expands from the peak of the first longitudinal rib toward the second longitudinal rib.

4. The chip receiver as in claim 3, wherein, with respect to the width direction, the peak of the first longitudinal rib is shifted from a middle position of the first longitudinal rib toward the second longitudinal rib.

5. The chip receiver as in claim 4, wherein the peak of the first longitudinal rib is located above in the height direction from a boundary of the first longitudinal rib.

6. The chip receiver as in claim 2, wherein
the sloping surface of the first longitudinal rib extends continuously to the second longitudinal rib.

7. The chip receiver as in claim 1, wherein a plurality of grooves or holes is formed on a surface of the first longitudinal rib.

8. The chip receiver as in claim 7, wherein each of the grooves or holes has an elongated shape in a direction traversing the longitudinal direction.

9. The chip receiver as in claim 1, wherein the receiving portion further comprises a traverse rib that traverses the first longitudinal rib.

10. The chip receiver as in claim 9, wherein the traverse rib is higher in height than the first longitudinal rib.

11. The chip receiver as in claim 1, wherein a plurality of projections is formed on at least a part of an edge of the receiving portion.

12. The chip receiver as in claim 11, wherein intervals between the plurality of projections are narrower than intervals between the plurality of cutting edges.

13. The chip receiver as in claim 11, wherein each of the projections has a concaved surface that faces toward the blade unit.

14. The chip receiver as in claim 1, wherein the receiving portion has a roughened surface.

15. A hedge trimmer comprising:
a main body comprising a prime mover;
a blade unit supported by the main body and configured to be driven by the prime mover, wherein the blade unit extends in a longitudinal direction, the blade unit has a first side and a second side, the first side is an opposite side of the second side in a width direction which is perpendicular to the longitudinal direction of the blade unit, and the first side has a plurality of cutting edges arranged along the longitudinal direction; and
a chip receiver as in claim 1 that is attached to the blade unit.

* * * * *